United States Patent Office 3,063,925
Patented Nov. 13, 1962

3,063,925
BOILING LIQUID TYPE NUCLEAR REACTOR
André Huet, 48 Ave. du President Wilson,
Paris XVI, France
Filed Nov. 6, 1958, Ser. No. 772,318
Claims priority, application France Nov. 19, 1957
6 Claims. (Cl. 204—193.2)

It is known that there are nuclear reactors in which the fuel rods are immersed in a tank containing a liquid, for example ordinary water or heavy water, which is brought to the boiling point and vaporized in order to absorb the heat emitted by the pile.

The present invention has for its object a nuclear reactor of this type the special feature of which consists in the fact that in the boiling liquid in the reactor there are disposed liquid and vapor separators constituted essentially by a helical device ensuring the gyration of the liquid circulating therein, while openings arranged in the wall of a tube located in the axis of the helix enable the vapor to escape axially. According to the invention, the fuel rods are disposed in such manner that the gaps existing between them can receive the separators and these rods may have a form such that it can conform to the outside of the helices separating the liquid and the vapor, so that the gyratory movement of the fluid can originate in the gaps between the rods. For example, the cross-section of the fuel rods disposed in staggered arrangement will be a square or rectangle with curvilinear sides, the face of which will fit or conform to the outside of the helices which, for example, are cylindrical. This arrangement, which has the advantage of assembling the pile in the smallest space, has the further advantage that the pile can operate in positions inclined with respect to the vertical, since there is no horizontal liquid level which is a function of the inclination.

Moreover, in the event the pile is equipped with an arrangement enabling the distances between the fuel rods to be varied, it is possible to vary in similar symmetrical fashion, with the aid of the same arrangement for example, the distance separating the axes of the separators, from the position of maximum approach, in which the fuel rods are applied against the helices of the separating tubes, to the position of maximum spacing or separation, it being possible for flexible deflecting surfaces made of light metal to be provided for covering the interstices which are then created between the rods.

The description which follows with reference to the figures of the accompanying drawing, which are given by way of example, will make it clearly understood how the invention can be carried into effect.

Figure 1:
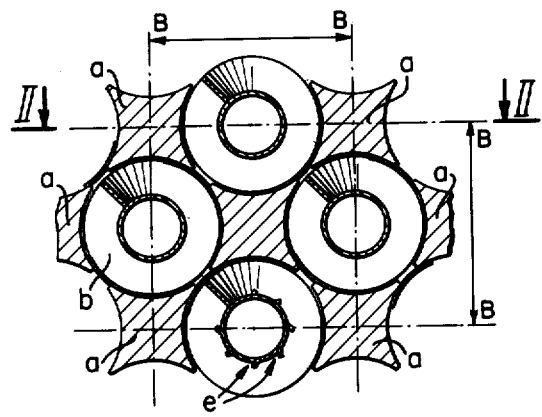
FIG. 1 shows in section at right angles to the axes of the fuel rods a part of a nuclear reactor equipped with liquid and vapor separators.
Figure 2:
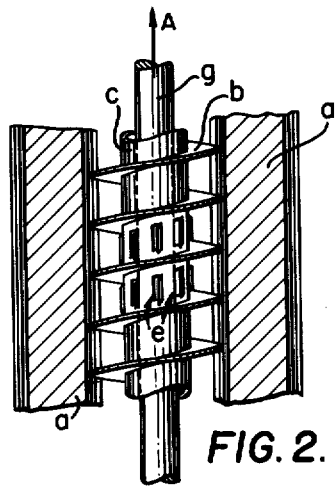
FIG. 2 is a vertical section on the line II—II of FIG. 1.

As will be seen in FIG. 1, the fuel rods $a$ of a nuclear reactor are disposed in staggered rows and the faces of these rods are of curvilinear section, so that passages of circular cross-section are formed between the various rods $a$. In these passages of circular cross-section there are disposed the liquid and vapor separators, which are constituted essentially by a helical surface $b$ mounted on the outside of an axial tube $c$. Openings or outlets $e$, which may be provided, if required, with vanes or flaps, are provided in the tube $c$ between the turns of the helix in order to pick up or collect the vapor given off by the fluid travelling in the form of a spiral along the helical ramp or incline $b$ and which centrifugal force throws towards the walls of the fuel rods. The vapor given off rises along the axis of the tube $c$ in the direction of the arrow A.

It will be seen that the gaps which are left clear between the fuel rods $a$ are such that they form around each separator an outer cylindrical casing, thus obliging the fluid to travel along the helical ramps or inclines $b$, where the gyratory effect and centrifugal force assist in the separation of the liquid and the vapor.

Figure 3:
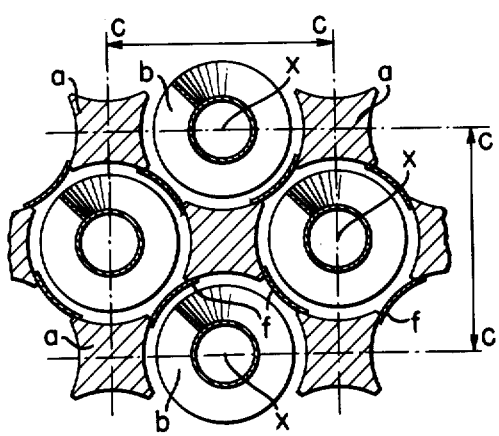
FIG. 3 is a view similar to FIG. 1 after the fuel rods and the separators have been spread apart.

The arrangement can be applied in combination with means permitting the intervals between the fuel rods $a$ to be varied, as shown in FIG. 3.

In FIG. 1, the interval between the axes of two rods in the same row is equal to the distance B—B. With the aid or known devices, it is possible to vary the distances between the rods in symmetrical fashion, for example so as to cause the distance B—B to become equal to the distance C—C represented in FIG. 3. These devices have not been shown in the figure because they do not, as such, form part of the invention. They may serve to shift the axes X of the separators at the same time, so that the latter always remain in the center of the gaps existing between the various fuel rods, as can be seen in FIG. 3.

According to the present invention, provision is made for the space left between the edges of the rods in this spread position of the latter (FIG. 3) to be closed by means of light, arched rectangular plates or slats $f$, one edge of which, for instance, is fixed to one fuel rod, while the other edge is applied by elasticity against the neighboring rod. These plates may be made, for example of aluminum, which is permeable to the neutron, and form springs to a slight extent. It will therefore be seen that even in the spread position shown in FIG. 3 cylindrical spaces of circular cross-section are formed between the fuel rods $a$ and cause the whole of the liquid contained in these spaces to assume a gyratory movement under the effect of the helical separators $b$.

Figure 4:
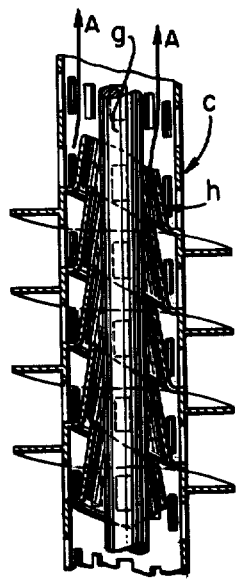
FIG. 4 shows in vertical section on a larger scale a separator with a moderating or control rod inside it.

Use may be made of the axial tube $c$ of the separator for housing control rods $g$. Inside the axial $c$ of the separators there may be provided, in known manner, deflecting devices $h$ constituted by elements of frustoconical general shape welded to the inside of the tube $c$ and which, being engaged one within the other in the form of nozzles, as will be seen in FIG. 4, have the effect of channelling the vapor in the direction of the arrows A.

As has been said above, the advantage of the arrangement forming the object of the invention resides in the fact that the reactor is able to operate even when it is inclined with respect to the vertical, since there is no clearly defined liquid level inside it, which is particularly important in the case of marine applications.

The helical ramp $b$ of the liquid and vapor separator may have a gradually varying pitch in one and the same separator and the pitches may be different from one separator to the other, according to the position of the separator in the reactor. The extent of the gradual change in the pitch may vary according to the location of the separator.

What I claim is:

1. A boiling liquid-type nuclear reactor having radially spaced-apart fuel rods therein for heating liquids to convert said liquids to vapors, said rods defining axially-extending gaps therebetween, a vapor-liquid separator in each gap comprising an axially-extending tube and a helical element around said tube, said tube having a wall formed with a plurality of orifices and each separator having a cross-section substantially corresponding to that of said gaps with said rods being formed with inwardly-curved sides to accommodate said helical element, whereby the separators substantially fill said gaps.

2. A boiling liquid-type nuclear reactor having radially spaced-apart fuel rods therein for heating liquids to convert said liquids to vapors, the cross-section of said rods being a quadrilateral having curvilinear sides and said rods being disposed in staggered fashion to define axially-extending gaps therebetween, a vapor-liquid separator in each gap comprising an axially-extending tube and a helical element around said tube, said tube having a wall formed with a plurality of orifices and each separator having a cross-section substantially corresponding to that of said gaps whereby the separators substantially fill said gaps.

3. A boiling liquid-type nuclear reactor having radially spaced-apart fuel rods therein for heating liquids to convert said liquids to vapors, said rods having adjacent but spaced-apart edges, the cross-section of said rods being of a quadrilateral having curvilinear sides and said rods being disposed in staggered fashion to define axially-extending gaps therebetween, a vapor-liquid separator in each gap comprising an axially-extending tube and a helical element around said tube, said tube having a wall formed with a plurality of orifices and each separator having a cross section substantially corresponding to that of said gaps whereby the separators substantially fill said gaps, and plates made of metal permeable to neutrons disposed between the adjacent edges of the fuel rods.

4. A boiling liquid-type nuclear reactor having radially spaced-apart fuel rods therein for heating liquids to convert said liquids to vapors, said rods defining axially-extending gaps therebetween, a vapor-liquid separator in each gap comprising an axially-extending tube and a helical element around said tube, said tube having a wall formed with a plurality of orifices and each separator having a cross section substantially corresponding to that of said gaps with said rods being formed with inwardly-curved sides to accommodate said helical element, whereby the separators substantially fill said gaps, and means permitting adjustment in symmetrical fashion of the distances between the axes of the fuel rods and the distances between the axes of the separators, whereby the latter are always disposed along the axes of the gaps between the rods.

5. A boiling liquid-type nuclear reactor having radially spaced-apart fuel rods therein for heating liquids to convert said liquids to vapors, said rods defining axially-extending gaps therebetween, a vapor-liquid separator in each gap comprising an axially-extending tube and a helical element around said tube, said tube having a wall formed with a plurality of orifices and each separator having a cross section substantially corresponding to that of said gaps with said rods being formed with inwardly-curved sides to accommodate said helical element, whereby the separators substantially fill said gaps, the pitch of said helical element varying among the separators in said reactor.

6. A boiling liquid-type nuclear reactor having radially spaced-apart fuel rods therein for heating liquids to convert said liquids to vapors, said rods defining axially-extending gaps therebetween, a vapor-liquid separator in each gap comprising an axially-extending tube and a helical element around said tube, said tube having a wall formed with a plurality of orifices and each separator having a cross section substantially corresponding to that of said gaps with said rods being formed with inwardly-curved sides to accommodate said helical element, whereby the separators substantially fill said gaps, the pitch of said helical element varying along the length of each separator.

References Cited in the file of this patent

UNITED STATES PATENTS

| | | |
|---|---|---|
| 1,734,136 | Kramer | Nov. 5, 1929 |
| 2,841,545 | Zinn | July 1, 1958 |
| 2,873,242 | Treshow | Feb. 10, 1959 |

FOREIGN PATENTS

| | | |
|---|---|---|
| 215,410 | Australia | June 4, 1958 |